US010476926B2

(12) United States Patent
Phillips et al.

(10) Patent No.: US 10,476,926 B2
(45) Date of Patent: Nov. 12, 2019

(54) SYSTEM AND METHOD FOR MANAGING ABR BITRATE DELIVERY RESPONSIVE TO VIDEO BUFFER CHARACTERISTICS OF A CLIENT

(71) Applicant: Ericsson AB, Stockholm (SE)

(72) Inventors: Chris Phillips, Hartwell, GA (US); Robert Hammond Forsman, Sugar Hill, GA (US); Jennifer Ann Reynolds, Duluth, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 603 days.

(21) Appl. No.: 14/737,550

(22) Filed: Jun. 12, 2015

(65) Prior Publication Data

US 2016/0366202 A1  Dec. 15, 2016

(51) Int. Cl.
| | |
|---|---|
| *G06F 15/16* | (2006.01) |
| *H04L 29/06* | (2006.01) |
| *H04L 12/26* | (2006.01) |
| *H04N 21/24* | (2011.01) |
| *H04N 21/262* | (2011.01) |
| *H04N 21/6373* | (2011.01) |
| *H04N 21/845* | (2011.01) |
| *G06F 15/173* | (2006.01) |

(52) U.S. Cl.
CPC ........... *H04L 65/602* (2013.01); *H04L 43/08* (2013.01); *H04L 65/4084* (2013.01); *H04L 65/80* (2013.01); *H04N 21/2401* (2013.01); *H04N 21/2402* (2013.01); *H04N 21/2407* (2013.01); *H04N 21/26258* (2013.01); *H04N 21/6373* (2013.01); *H04N 21/8456* (2013.01)

(58) Field of Classification Search
CPC . H04L 67/2828; H04L 65/4084; H04L 67/02; H04L 65/80
USPC ................................................. 709/231, 232
See application file for complete search history.

(56) References Cited

U.S. PATENT DOCUMENTS

| | | | |
|---|---|---|---|
| 2009/0222873 A1* | 9/2009 | Einarsson | H04N 21/23406 725/115 |
| 2013/0204997 A1* | 8/2013 | Eggleston | H04L 41/5009 709/223 |
| 2014/0013376 A1 | 1/2014 | Xu et al. | |
| 2014/0219230 A1 | 7/2014 | Schierl et al. | |

* cited by examiner

*Primary Examiner* — Karen C Tang

(57) ABSTRACT

A scheme for managing delivery of segmented media content in an ABR network, wherein bitrates of a manifest file may be selectively modified or removed based on a client device's video buffer characteristics. An ABR stream delivery server is operative to simulate the client device's video buffer in a streaming session and accordingly modify the manifest files to include metadata for media segments encoded at a particular single bitrate responsive to the buffer performance and other network conditions. Responsive to monitoring the video buffer characteristics of the media player during the streaming session, a selected single bitrate may be moved up or down to other bitrates of the manifest files.

16 Claims, 12 Drawing Sheets

SYSTEM AND METHOD FOR MANAGING ABR BITRATE DELIVERY RESPONSIVE TO VIDEO BUFFER CHARACTERISTICS OF A CLIENT

FIELD OF THE DISCLOSURE

The present disclosure generally relates to communication networks. More particularly, and not by way of any limitation, the present disclosure is directed to a system and method for managing bitrate delivery in an adaptive bitrate (ABR) streaming environment responsive to video buffer characteristics of a client device.

BACKGROUND

With the advent of new technology, e.g., home gateways with multiple tuners and Converged Cable Access Platforms (CCAPs), and the like, IP video services are now becoming feasible and cost-effective, in both wireline as well as wireless environments. Also, content delivery networks or CDNs are being developed to distribute various types of content via adaptive bitrate (ABR) streaming and non-ABR download sessions. It is known that ABR can result in unfair and sometimes incongruous apportionment of bandwidth on a network based upon the order multiple clients begin to use a network resource. Since the bandwidth usage is typically determined by a client requesting the content, and because the ABR clients can be opportunistic, they may become greedy. Traditional bandwidth management schemes are deficient in a multi-client environment, however, especially where the negative effects of a greedy client become more pronounced in the presence of a duty cycle of another ABR client. Additionally, different clients behave differently and often unpredictably, which poses further challenges to a network provider that aims to provide a more consistent quality of service across the board in the network.

SUMMARY

The present patent disclosure is broadly directed to a system, method, and associated non-transitory computer-readable media for facilitating a scheme for managing and manipulating delivery bitrates in an ABR streaming environment responsive to video buffer characteristics of a client device and other network conditions. In one aspect, an embodiment of method operative at an ABR stream delivery server comprises, inter alia, obtaining, modeling or simulating video buffer characteristics of a media player associated with a client device configured to receive segmented media content from the ABR delivery server in a streaming session. Manifest files of the segmented media content may be modified to only include metadata information of media segments encoded at a particular single bitrate and removing metadata information pertaining to media segments encoded at other bitrates, wherein the particular single bitrate is selected based at least in part upon the modeled video buffer characteristics of the client device's media player. The modified manifest files are provided to the client device in order to facilitate downloading of the segmented media encoded at the bitrate selected by the ABR stream delivery server rather then at a bitrate requested by the client device. Also, in a further implementation, the selected single bitrate may be moved up or down by the ABR stream delivery server to other bitrates of the manifest files responsive to continued monitoring of the video buffer characteristics of the media player during the streaming session.

In another aspect, an embodiment of an apparatus configured to operate as an ABR delivery server at an edge network or at some other network location for managing delivery of segmented media content in an ABR network is disclosed. The claimed embodiment comprises, inter alia, at least one processor and a client buffer database for storing simulated video buffer characteristics of one or more client devices operative to receive segmented media content in respective streaming sessions. A persistent memory module coupled to the at least one processor is configured to include program instructions which, when executed by the at least one processor, perform the following: learning video buffer characteristics of a client device's media player in a streaming session pursuant to a media request therefor; storing the learned video buffer characteristics in the client buffer database; modifying manifest files of the segmented media content requested by the client device to include metadata information of media segments encoded at a particular single bitrate and removing metadata information pertaining to media segments encoded at other bitrates, wherein the particular single bitrate is selected based at least in part upon the video buffer characteristics of the client device's media player; and providing the modified manifest files to the client device responsive to monitoring the video buffer characteristics of the media player during the streaming session.

In still further aspects, one or more embodiments of a non-transitory computer-readable medium containing computer-executable program instructions or code portions stored thereon are disclosed for performing one or more embodiments of the methods set forth above when executed by a processor entity of a edge network node or an upstream network node, and the like. Further features of the various embodiments are as claimed in the dependent claims appended hereto.

Advantages of the present invention include, but not limited to, the ability to provide a consistent quality of service to end users (e.g., no jarring effects due to rapid changes in video quality due to greedy ABR client behavior) in a network environment. As the adaptive streaming clients are simply not suited to making complex and more nuanced assessments about bandwidth, given their limited network knowledge and opportunistic data pulling decisions, embodiments set forth herein place delivery bitrate decision-making at a suitable network node that has a broader visibility into the network conditions as well as individual clients' video buffer performance so as to facilitate a more optimal video service throughout the network. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
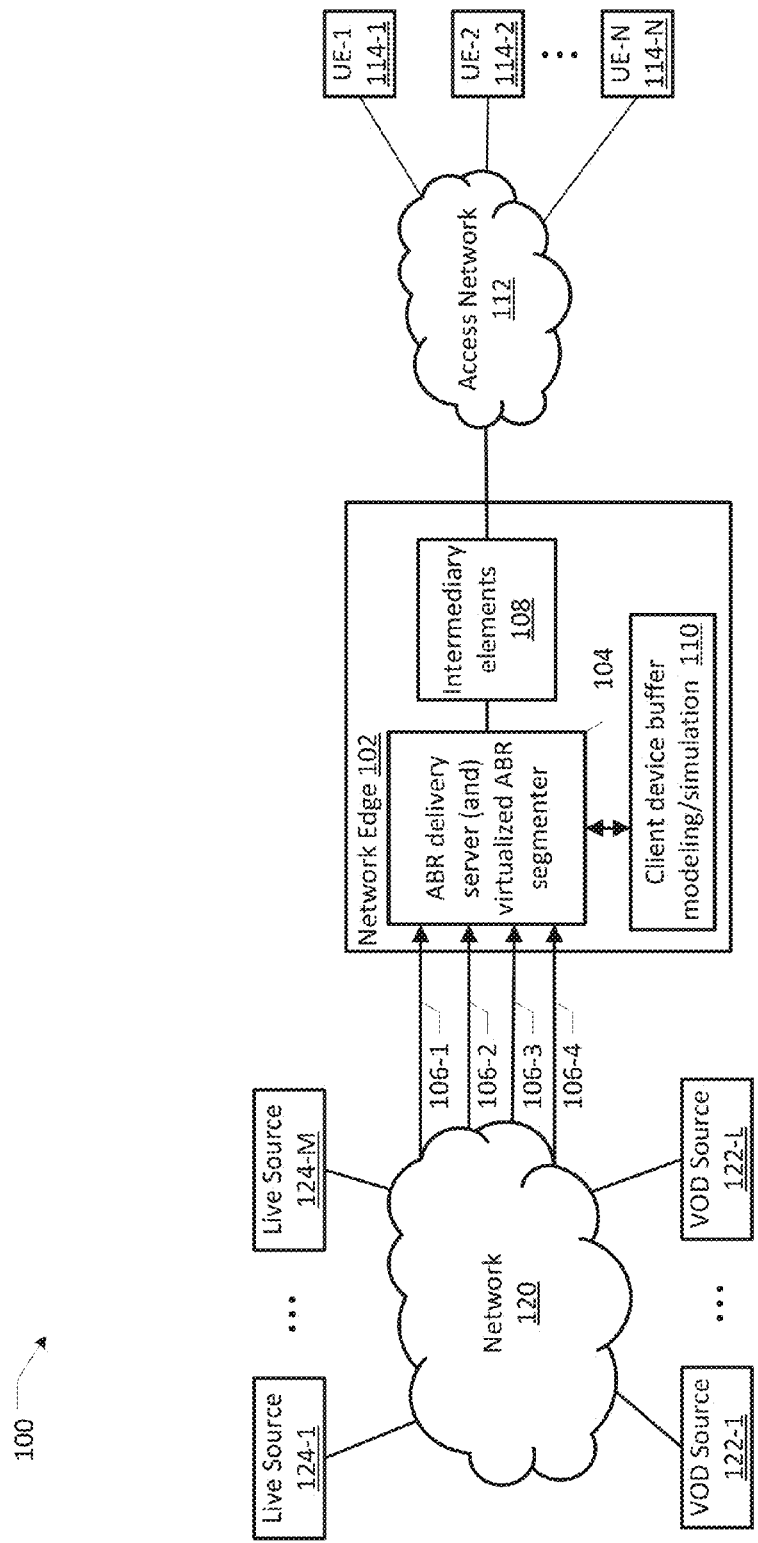
FIG. 1 depicts an example ABR network environment wherein one or more embodiments of the present invention may be practiced for managing bitrate delivery responsive to video buffer characteristics of a client device.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Further, suitable network elements including one or more embodiments set forth herein may involve terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. Accordingly, some network elements may comprise "multiple services network elements" that provide support for multiple network-based functions (e.g., A/V media delivery policy management, session control, QoS policy enforcement, bandwidth scheduling management based on weighted fair queuing (WFQ), subscriber/device policy and profile management, content provider priority policy management, streaming policy management, and the like), in addition to providing support for multiple application services (e.g., data and multimedia applications). Example subscriber end stations or client devices may comprise ABR client devices and/or non-ABR client devices, which may include progressive download client devices, for instance, and may be referred to simply as "clients" for short. Illustrative client devices may therefore include any device configured to execute, inter alia, a streaming client application for receiving and rendering content, either live media or static/on-demand media, from one or more content providers, e.g., via a broadband access network, in accordance with one or more streaming protocols and technologies such as, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. Accordingly, such client devices may include set-top boxes (STBs), TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via a suitable high speed broadband connection for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example ABR streaming network environment 100 wherein one or more embodiments of the present invention may be practiced for managing bitrate delivery to a client device responsive to the client's video buffer characteristics, network conditions, and the like, among others, with respect to streaming media content from a content source. In general, the terms "media content" or "content file" (or, simply "content") as used in reference to at least some embodiments of the present patent disclosure may include digital assets or program assets such as any type of audio/video content that may comprise live capture media or on-demand media, e.g., over-the-air free network television (TV) shows or programs, pay TV broadcast programs via cable networks or satellite networks, free-to-air satellite TV shows, IPTV programs, Over-The-Top (OTT) and video-on-demand (VOD) or movie-on-demand (MOD) shows or programs, time-shifted TV (TSTV) content, etc. By way of illustration, a plurality of live content sources 124-1 to 124-M and a plurality of static/on-demand content sources 122-1 to 122-L are shown in the streaming environment 100 that exemplify various such content sources. Media content from the content sources may be transmitted via a network 120 (e.g., an IP network using HTTP) as encoded content streams, which may be either segmented or unsegmented, to an edge network 102 serving a plurality of UE devices 114-1 to 114-N. For example, reference numerals 106-1 to 106-4 refer to ABR segmented VOD streams, ABR segmented live media streams, as well as unsegmented VOD and live streams that are encoded in ABR-friendly manner. Appropriate manifest files with metadata information describing the multiple bitrates used for encoding content at different resolutions and Uniform Resource Locator (URL) pointers of various segments of encoded media content are also provided for effectuating streaming sessions via an access network 112 that may be part of a DSL network architecture, a DOCSIS-compliant Cable Modem Termination System (CMTS) network architecture, a mobile telecommunications network architecture, and/or a CDN architecture. Accordingly, suitable intermediate elements such as routers, access multiplexers, CMTS nodes, etc., collectively shown as elements 108, may be provided in association with the network edge 102 for coupling with the access network 112.

Although not specifically shown in FIG. 1, at least a sub-group of UE devices 114-1 to 114-N may be operative as tethered or untethered customer premises equipment (CPE) devices associated with a subscriber premises in one example implementation. Regardless of the type of access network 112 or whether a UE device is part of a subscriber premises, a served UE device is operative as an ABR streaming device that may include one or more suitable media players configured to interoperate with applicable streaming protocols and technologies. As will be set forth in further detail below, an edge network node such as an ABR stream delivery server 104 may be advantageously provided with a client device buffer modeling/simulation block or element 110 for monitoring, learning and simulating various characteristics associated with a video buffer of the streaming media player of a particular UE device of the network environment. In one arrangement, the ABR stream delivery server 104 is operative to provide a more optimized streaming service by modulating, modifying, and selecting appropriate bitrates of encoded media segments in a manifest (e.g., a master manifest and/or associated child manifests) for transmission in response to the video buffer characteristics and other network conditions as may be applicable. Since the decision-making for bitrate selection in modified manifests is provided at a network level, and because the network node (e.g., ABR delivery server 104) has a broader awareness of the overall network conditions (e.g., upstream/north-bound and/or downstream/south-bound conditions) as well as respective UE devices' video player/buffer performance, a more consistent service quality may be achieved throughout the network.

In a further variation, a dynamic virtualized ABR segmenter may also be provided with the ABR stream delivery server 104 for dynamically segmenting an incoming media content stream at appropriate locations, e.g., based on stream access points (SAPs) and associated timing information, e.g., presentation and decoding timestamps (i.e., PTSs/DTSs), and virtualizing the segment representation in a random access memory (RAM) unit, that may be utilized in an embodiment of the present invention in order to facilitate manipulation and selection of appropriate bitrates in the manifest files for purposes set forth herein. In a still further embodiment, a bandwidth controlled/monitored delivery system may also be provided or otherwise associated with the ABR stream delivery server 104 at a network edge in order to facilitate throttling of bandwidth allocation (e.g., based on techniques such as weighted fair queuing or WFQ) of a bandwidth pipe serving a group of subscribers or end stations.

Broadly, embodiments herein are directed to a system in which a server (e.g., ABR stream delivery server 104 described above) can estimate and model a specific client's buffer size (using a variety of means discussed below) in a streaming session. Once the client's video buffer size is estimated, it is simulated or otherwise modeled in the network. The server provides the client with a single bitrate manifest instead of a full manifest having metadata for multiple bitrate representations. Accordingly, rather than the client deciding to change the bitrates of the segments (i.e., the video quality) to be downloaded, the server decides an optimum bitrate based on the client's buffer characteristics, policies, and systemic network conditions, inter alia. In an embodiment, therefore, a client device may receive a network-decided quality (e.g., 1 Mb/s) instead of its requested quality (e.g., 2 Mb/s). In accordance with the teachings herein, the server and/or its associated functionality can be configured to estimate a client's buffer size in multiple ways. For instance, in one implementation, a client's segment download behavior may be monitored over a certain period of time to assess and evaluate whether there is a consistent pattern (e.g., whether the client device always pulls the same number of segments, the same number of bytes, and/or the same number of seconds of video, etc.). Another embodiment may involve provisioning a database of client devices, their model/manufacturer information, device ID or other indicia, as well as default buffer sizes (e.g., the number of segments or the total number of bytes), etc. When a client initiates a streaming session and makes a pull, the client's make and model may be registered and a database query may be performed to determine what type of buffer is to be modeled.

Figure 2:
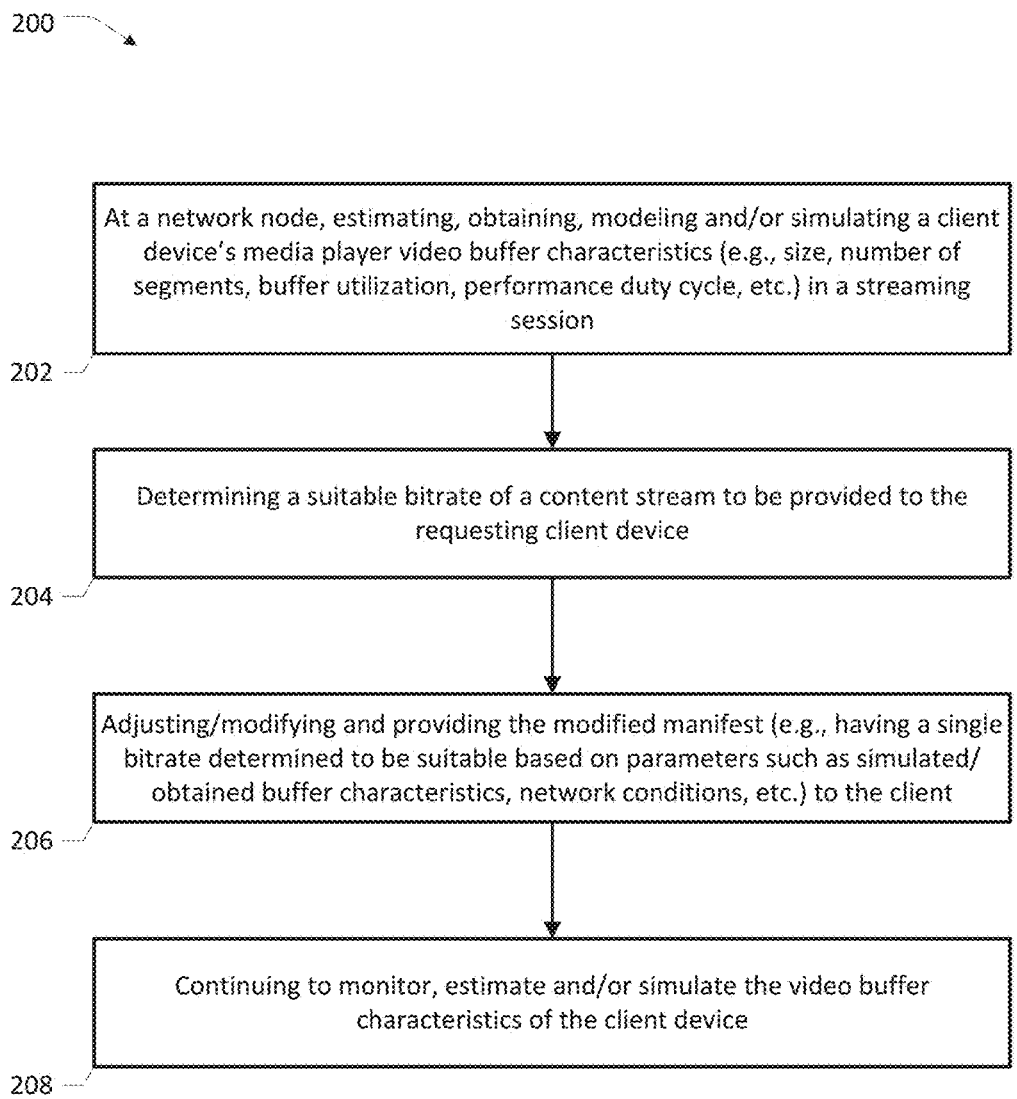
FIG. 2 depicts a flowchart of various steps, acts, blocks and/or functions that may take place at a network node configured as an ABR delivery server relative to an illustrative process for managing bitrate delivery according to an example embodiment.

FIG. 2 depicts a flowchart of various steps, acts, blocks and/or functions that may take place at a network node or apparatus configured as an ABR delivery server, e.g., ABR delivery server 104 in FIG. 1, relative to a bitrate delivery management process 200 according to an example embodiment. At block 202, video buffer characteristics of a media player associated with a client device are obtained, wherein the client device is configured to receive segmented media content from an ABR delivery server in a streaming session. As pointed out previously, the video buffer characteristics may be obtained via a number of methodologies and techniques such as learning a client's buffer performance and modeling the device buffer in a memory at the network node, query or lookup of a pre-provisioned client device database, etc. Also, the video buffer characteristics may comprise at least one of an estimated number of segments operative to be stored in the video buffer of the media player, an estimate of segment duration, a total number of bytes of data that the video buffer is estimated to contain when full, among others. In similar fashion, a more dynamic simulation or modeling of the video buffer playout performance may be obtained based on learning a duty cycle pattern associated with downloading of segmented media content by the client device. According to an example embodiment, the estimated number of segments and total number of bytes that can be stored in the media player's video buffer may be calculated upon reaching a maximum delivery bitrate (e.g., as per the highest bitrate resolution indicated in the original manifest file) during a ramp up phase of the streaming session. Relatedly, a segment duration estimate may be obtained upon learning the duty cycle pattern of the client device associated with downloading of the segmented media content after reaching a steady state like condition. A determination may be made to obtain or estimate a single bitrate suitable for transmission to the client device based at least in part upon the video buffer characteristics of the requesting client device, including or independent of any other network conditions that may also be monitored by the network node (block 204). Responsive to the determination, the manifest files for the segmented media content may be modified or adjusted to include only the metadata information of media segments encoded at a particular single bitrate, whereby metadata information pertaining to media segments encoded at other bitrates is removed. The adjusted/modified manifest files are provided to the client device for facilitating the streaming of content at a rate that the network node has determined to be optimal and/or more consistent in view of the overall network dynamics, rather than at requested rates that the client device may have desired due to its own opportunistic/greedy behavior (block 206). As long as the client device's streaming session continues, the network node may proceed with monitoring, estimating and/or simulating the video buffer characteristics of the client device's media player (e.g., either continuously or at discrete intervals, which may be periodic or aperiodic, or more dynamically based on real time network conditions) in order for optimizing delivery bitrates for the session (block 208).

Figure 3:
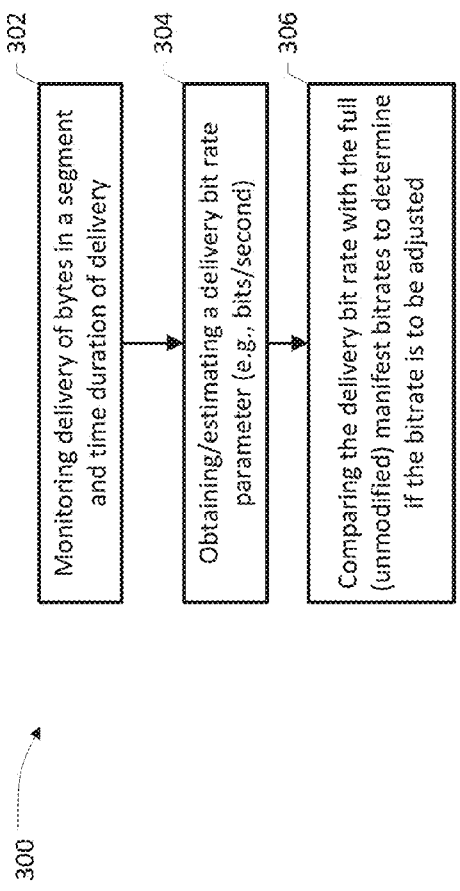
FIG. 3 depicts a flowchart of additional steps, acts, blocks and/or functions that may take place relative to an illustrative process for managing bitrate delivery according to an example embodiment.

Turning to FIG. 3, depicted therein is a flowchart of additional steps, acts, blocks and/or functions that may take place relative to an illustrative process 300 for managing bitrate delivery according to an example embodiment, wherein one or more such additional features may be implemented as part of the process flow 200 described above. At blocks 302 and 304, delivery of a particular segment and the total number of bytes comprising the segment may be monitored in order to obtain or estimate a delivery bitrate (i.e., bits per second). As will be set forth in additional detail below, delivery bitrates may be computed in an example implementation by applying suitable timer mechanisms and appropriate feedback signaling received from the client device corresponding to the transmission protocols being employed (e.g., TCP Acknowledgement messages). Further, the delivery bitrates may be computed on a segment-by-segment basis, and to achieve more statistical confidence, bitrate data computed from two or more segments may be averaged or otherwise statistically treated in one variation. Regardless of how a particular implementation obtains the calculated delivery bitrate, a comparison process may be effectuated to compare the calculated delivery bitrate against the bitrate representations indicated in the full i.e., unmodified, manifest file(s) of the requested media, whereby a determination may be made as to whether the bitrate(s) for subsequent segments needs to be adjusted (block 306). Accordingly, the manifest files of the subsequent segments may be modified to include a single bitrate responsive to at least one of the determining and network bandwidth conditions monitored relative to other client devices disposed in the ABR network, e.g., as set forth in the present patent application.

Figure 4:
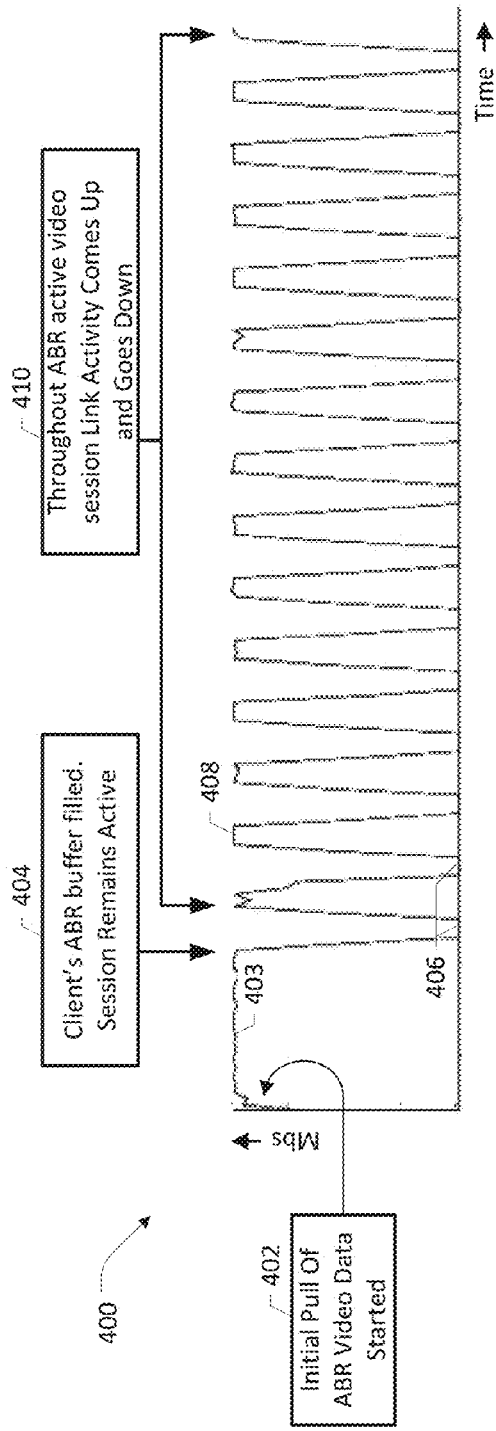
FIG. 4 depicts an embodiment of duty cycle behavior with respect to an example ABR client device's media player that may be learned by an ABR delivery server for modeling or simulating the media player's video buffer characteristics.

FIG. 4 depicts a rendition of a screenshot embodiment 400 of duty cycle behavior with respect to an example ABR client device's media player that may be learned by an ABR delivery server for modeling or simulating the media player's video buffer characteristics relative to a streaming session engaged by the ABR client device. It should be appreciated that a data download pattern may be observed by plotting the rate of data being pulled by the ABR client device on one coordinate (e.g., on Y-axis) against time on the other coordinate (e.g., X-axis) over a period of time duration. Generally, the ABR client begins to fill its media buffer as hard as it can during initial startup phase 402 until it reaches a maximum capacity allowed under the network conditions (e.g., capped to a certain megabits/second of the managed delivery pipe such as 2 Mbs, 4 Mbs, 6 Mbs, etc.), as exemplified by trace portion 403. The client's media player may begin rendering/playout depending on the player implementation, and after a certain period of time, the ongoing action of downloading results in reaching a maximum buffer capacity. As the content segments are being downloaded into the client's buffer, their size and number may be monitored or otherwise tracked, e.g., during the level off period 403. Accordingly, until the buffer is full, the session link remains active (block 404) during ramp up, and the client's duty cycle may commence thereafter. While a segment is being played out of its buffer, the client device may enter into a temporary inactive, or sleep, phase 406. When the playback of the segment is completed, the client (re)enters an active, or awake, phase 408, for pulling or downloading another block of content (e.g., the next segment) from the network so as to keep the buffer full (i.e., completely fill its capacity). This sequence or pattern of alternating active and sleep phases continues for the entire video session until a control action (e.g., pause, trick mode navigation, stop, etc.) takes place. It should be appreciated that throughout the ABR active video session, link activity (e.g., traffic activity on a wired or wireless link) comes up and goes down accordingly (i.e., oscillates) as set forth in block 410.

Figure 5:
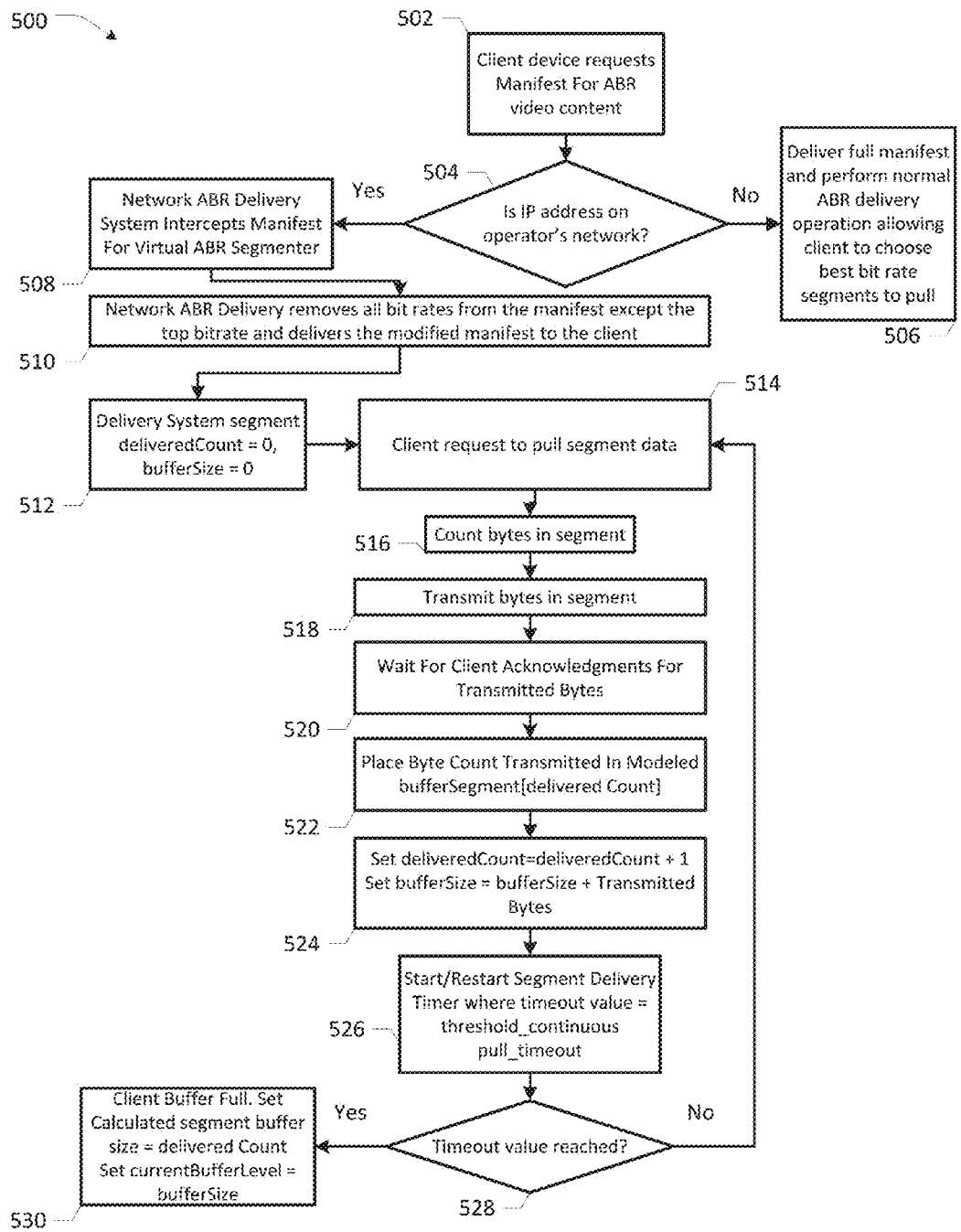
FIG. 5 depicts a flowchart of various steps, acts, blocks and/or functions that may take place relative to an illustrative process for learning a client device's video buffer characteristics according to an example embodiment.

FIG. 5 depicts a flowchart of various steps, acts, blocks and/or functions that may take place relative to an illustrative process 500 for learning a client device's video buffer characteristics according to an example embodiment. At block 502, a client device's request for manifest information associated with ABR content pursuant to a media session is received at an operator network node. A decision block 504 is operative to determine whether a network address (e.g., IP address) of the requesting client device is known to the operator network. If so, it is likely that the segment delivery will be from the operator's network with no external CDNs being involved. Otherwise, involvement of intermediary CDNs is possible, wherein the segment delivery may be effectuated from an external CDN edge node, which in one implementation may allow caching of the segments at different bitrate resolutions. In such a scenario of external CDN involvement, full manifest files may be provided for facilitating normal ABR delivery operations that allow the client device to choose best bitrate segments for pulling. Accordingly, as there is no need for the buffer learning process to continue, it may therefore be terminated (block 506).

Where no external CDN involvement is assumed or implicated, an ABR delivery system or server associated with the network node may be configured to proceed with the buffer learning process as set forth herein. In an arrangement where a dynamic virtual ABR segmenter is associated with the ABR delivery system node, requests for the manifest with respect to the virtual ABR segmenter may be intercepted or generated by the ABR delivery system. In an arrangement involving no virtual segmentation, the ABR delivery system may directly act on the manifest files. In either implementation, the ABR delivery server is operative to remove all bitrates from the manifest file except the top bitrate and deliver the modified manifest file to the client device (blocks 508, 510). At block 512, a deliveredCount variable is set to 0 and bufferSize variable is set to 0 to initialize appropriate counters for the number of segments and the total number of bytes. As the client device begins to pull the segment data (block 514), the bytes therein being transmitted may be counted (blocks 516, 518). The buffer learning process 500 may be configured to wait for receipt of acknowledgement messages from the client device, which messages may be received on a packet-by-packet basis, for example, with respect to the transmitted bytes (block 520). The byte count and segment count may be placed in suitable memory locations at the network node as modeled buffer size and segment count variables, which may be incremented as the segment and its byte data are delivered to the client device (blocks 522, 514). For instance, deliveredCount variable may be incremented by 1 while the bufferSize variable may be incremented by the amount of transmitted bytes. A segment delivery timer may be set/reset and compared against a preconfigured timeout value, which may be set at a configurable variable called threshold_continuous pull_timeout (block 526), which would typically be set to ensure that continuous segment downloading is taking place. As no known ABR segment is less than ~1-2 seconds in duration, this variable may be preconfigured accordingly. Essentially, this variable may be implemented in order to ascertain that the ABR client keeps pulling the segments and fills its buffer before entering sleep mode, whereby the system is configured to monitor the continuous pulling session to determine or otherwise estimate the number of segments and total number of bytes pulled during that portion of the session as the buffer reaches its capacity. A process loop may therefore be effectuated until the timeout value is reached (block 528). Upon completion of the process loop, a determination is made that the client device's video buffer is full, with the calculated buffer size being the number of segments delivered and the current buffer level being the total number of bytes delivered, as set forth in block 530. It should be appreciated that the foregoing steps may also be repeated a number of times for different streaming sessions engaged by the client device so as to improve the accuracy/confidence of the estimation of the client buffer's number of segments and its total bytes level.

In an embodiment where the size or duration of segments is not known (which is not an issue in a virtual segmentation scenario, for example, because the virtual segmenter is operative to construct segments one or more predetermined lengths), an example process for monitoring the size or duration of individual segments may involve initializing a client sleep timer that runs based on when the client starts to pull a segment. As the client device stops or completes the segment pull, the sleep timer is stopped and the segment duration is determined as the sleep timer duration. It should be appreciated that these features may be incorporated in the foregoing buffer learning process as part of additional, alternative and/or optional embodiments.

Figure 6:
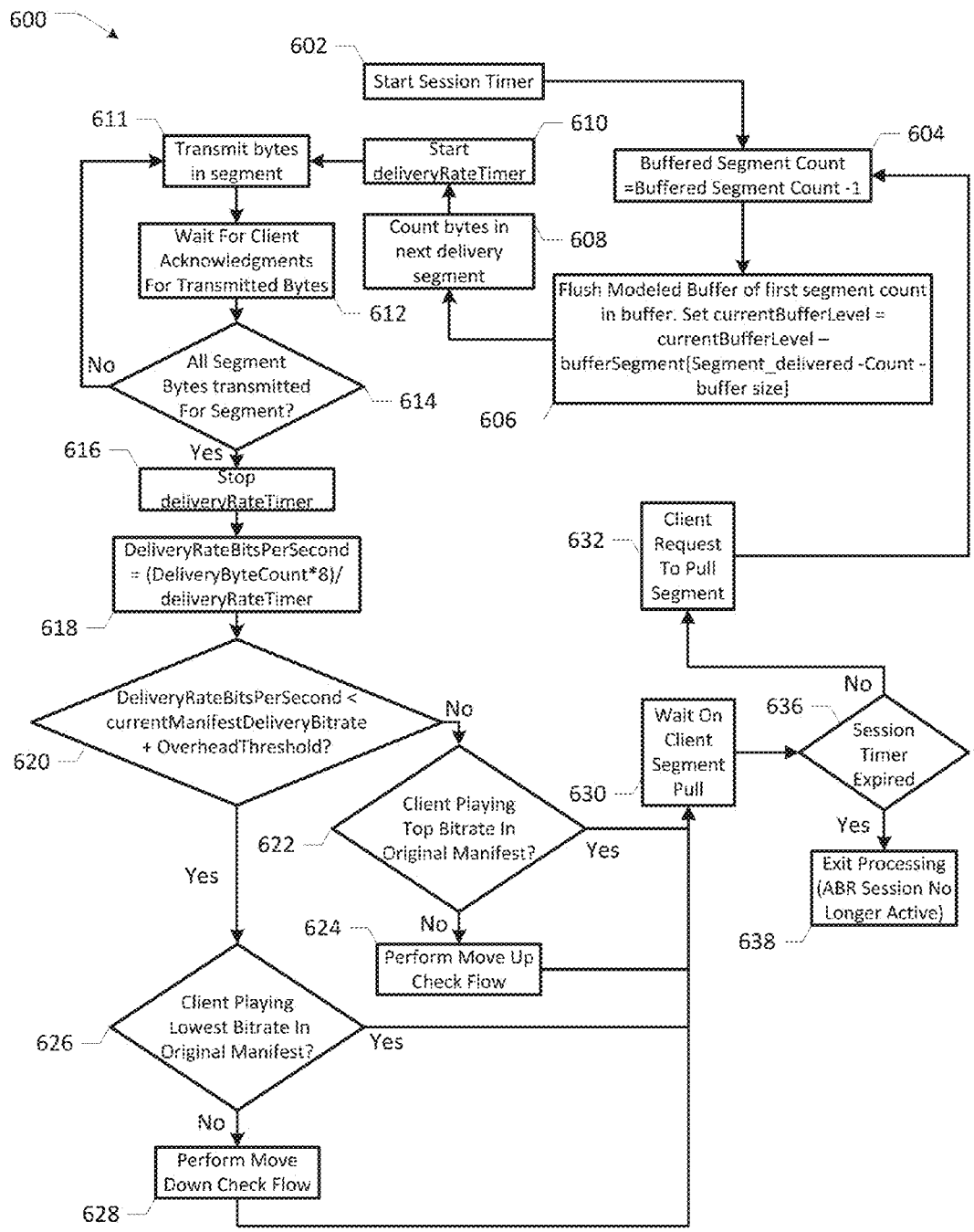
FIG. 6 depicts a flowchart of various steps, acts, blocks and/or functions that may take place relative to an illustrative process for modifying delivery bitrates to a client device based on monitoring its video buffer characteristics according to an example embodiment.

Turning now to FIG. 6, depicted therein is a flowchart of various steps, acts, blocks and/or functions that may take place relative to a delivery bitrate modification process for modifying manifests and selecting suitable bitrates for delivery to a client device based on monitoring and learning its video buffer characteristics according to an example embodiment. At block 602, a session timer may be initiated or reinitiated, or may be carried over from a session timer setting in a buffer learning process preceding the bitrate modification process 600. A buffered segment Count variable is decremented, e.g., to account for the segment that a client device has just played (block 604). Accordingly, the modeled buffer variables, including a current BufferLevel variable, are also appropriately updated (block 606). The number of bytes in a next segment to be delivered is counted (block 608) and a deliveryRate Timer variable is initialized (block 610). As the segment data bytes are transmitted, the process waits for receipt of acknowledgement messages from the client device, until all segments bytes have been transmitted, as set forth at blocks 611, 612 and 614. After transmitting all the segment bytes, the deliveryRate Timer is stopped (block 616), whereupon an actual delivery bitrate variable (i.e., bits per second) is computed based on the total number of bytes transmitted and the monitored duration of time taken for transmitting all the segment bytes (e.g., as indicated by the deliveryRate Timer value) (block 618). The calculated delivery bitrate is then compared against a bitrate indicated in the current manifest bitrate, after taking into account a guard band of an overhead threshold value in some example implementations (block 620). If the computed delivery bitrate is less than the current manifest bitrate plus the added overhead, it may be established that the client device's buffer playout conditions (and the network conditions) are not satisfactory for sending the media segments at the current bitrate resolution indicated in the manifest file. If the client device is not playing the lowest bitrate of the original manifest (block 626), it may be further established that the network node can move the bitrates to a lower level in a move down process (block 628), as will be set forth in additional detail below. On the other hand, if the client device is already playing the lowest bitrate content, the ABR delivery system bypasses the bitrate adjustment and waits for the client device's segment pull and associated request (blocks 630, 632). To ensure that the bitrate modification process exits gracefully if or when the client device is stuck in an extended inactive or pause mode, a prophylactic loop based on the session timer's expiration may be implemented as set forth at blocks 636 and 638. If the session timer has not expired (e.g., the session timer is still under a threshold value), the client device's pull requests are received in normal fashion (block 632), which return the control of flow to the beginning of the bitrate modification process 600 for further monitoring and subsequent bitrate modifications as may be needed.

If the computed delivery bitrate is greater than (or equal to) the current manifest bitrate plus the added overhead, it may be established that the client device's buffer playout conditions (and the network conditions) may allow sending the media segments at a higher bitrate resolution. A further determination may be made as to whether the client device is already playing at the highest bitrate of the original manifest (block 622). If not, it may be further established that the network node can move the bitrates to a higher level in a move up process (block 624), which will be set forth in further detail below. On the other hand, if the client device is already playing the highest bitrate content, the ABR delivery system bypasses the bitrate adjustment and waits for the client device's segment pull and associated request (blocks 630, 632) similar to the process flow described above.

Figure 7:
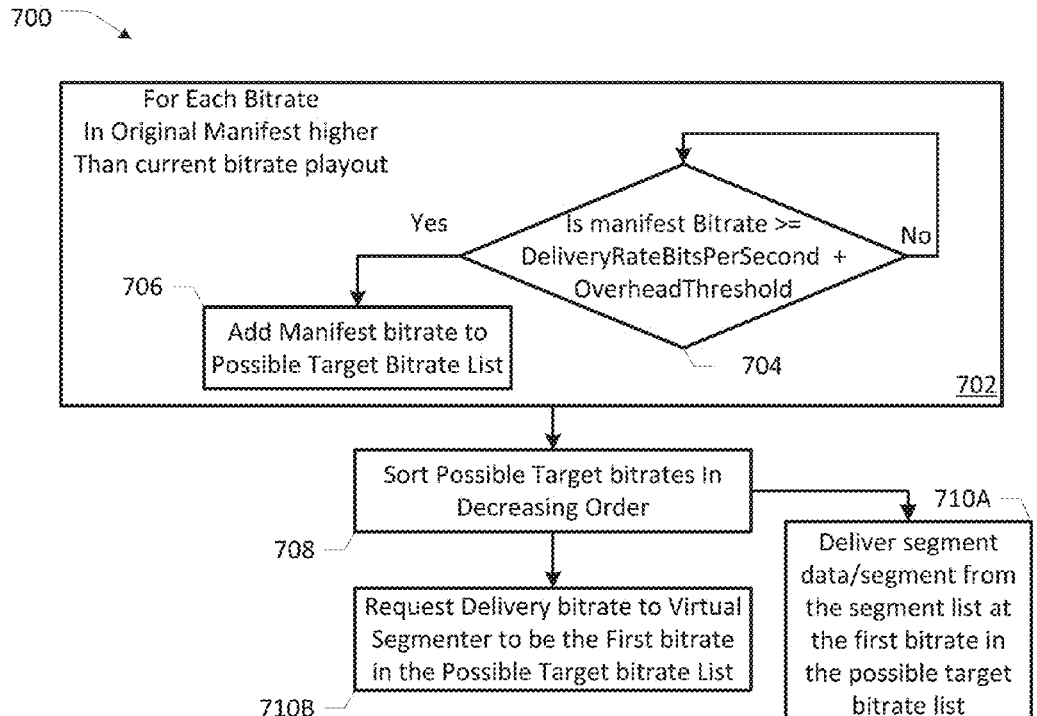
FIG. 7 depicts a flowchart of various steps, acts, blocks and/or functions that may take place relative to a bitrate move up process operative in the embodiment illustrated in FIG. 6.
Figure 8:
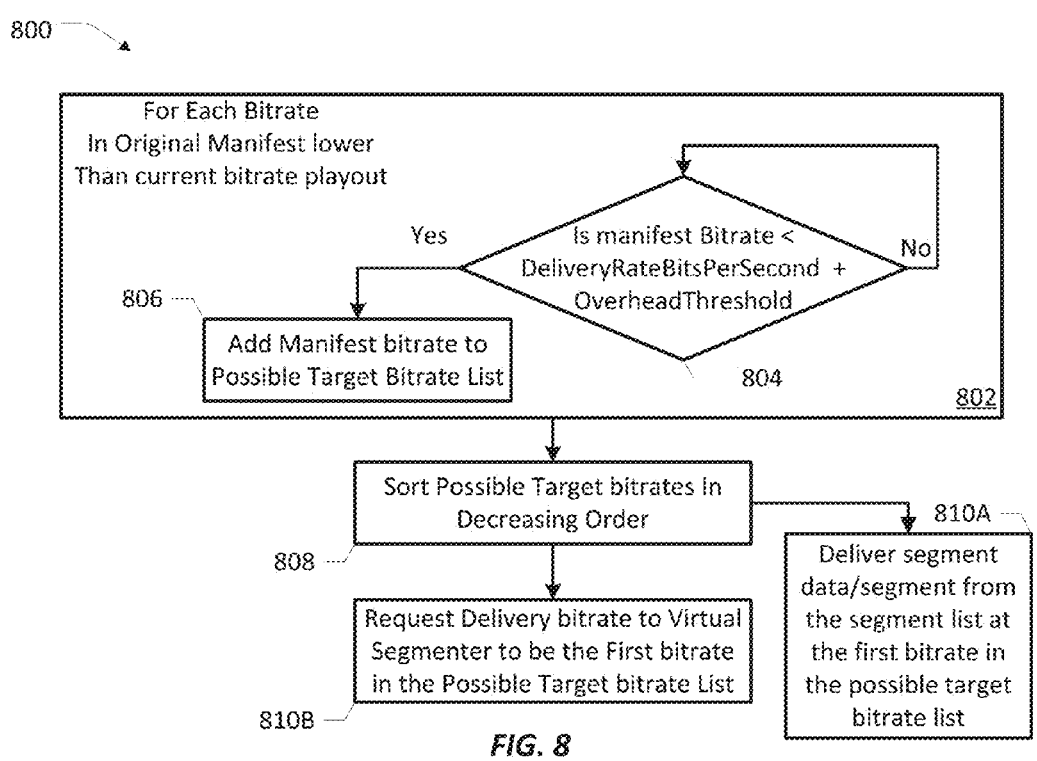
FIG. 8 depicts a flowchart of various steps, acts, blocks and/or functions that may take place relative to a bitrate move down process operative in the embodiment illustrated in FIG. 6.

FIGS. 7 and 8 depict flowcharts of a bitrate move up process and a bitrate move down process, respectively, operative in the embodiment illustrated in FIG. 6. Turning first to FIG. 7, a bitrate move up process 700 commences with an iterative loop process 702. For each bitrate indicated in the original manifest file that is higher than a current delivery bitrate for playout, loop 702 is executed wherein the bitrates of the manifest file are compared against the calculated delivery bitrate (plus an overhead guard band), as shown in block 704. If the manifest's bitrate is greater than or equal to the calculated rate plus the guard band, that bitrate added to a list of potential target bitrates (block 706). Upon completion of the iterative process 702, the list of potential target bitrates is sorted in decreasing order (block 708). Depending on whether a virtualized ABR segmenter is being implemented in conjunction with the ABR stream delivery server, a manifest request may be made to the virtualized ABR segmenter to select the first bitrate (i.e., highest bitrate possible) of the potential bitrate list as the manifest file's bitrate for delivery to the client device (block 710B). If there is no virtualized ABR segmenter, the ABR stream delivery server may be configured to deliver the modified manifest data and/or segment data from the segment list at a select bitrate, e.g., the first bitrate in the possible target bitrate list (i.e., the highest bitrate from the list) to the client device (block 710A).

In a bitrate move down process 800 shown in FIG. 8, an iterative loop 802 is similarly executed to determine a potential list of target bitrates to which the ABR stream delivery server can move down to. For each bitrate indicated in the original manifest file that is lower than a current delivery bitrate for playout, a determination is made if the manifest's bitrate is less than the calculated rate plus the guard band (block 804). If so, that bitrate added to a list of potential target bitrates (block 806), which is then sorted in decreasing order (block 808). Similar to the move up process 700 above, the ABR stream delivery server may request a virtualized ABR segmenter for a manifest with the appropriate bitrate (block 810B) or deliver the modified manifest and/or segment data from the segment list at a select bitrate, e.g., the first bitrate in the possible target bitrate list (i.e., the first bitrate from the list, which is lower than the calculated bitrate but closest to it) to the client device (block 810A).

Figure 9:
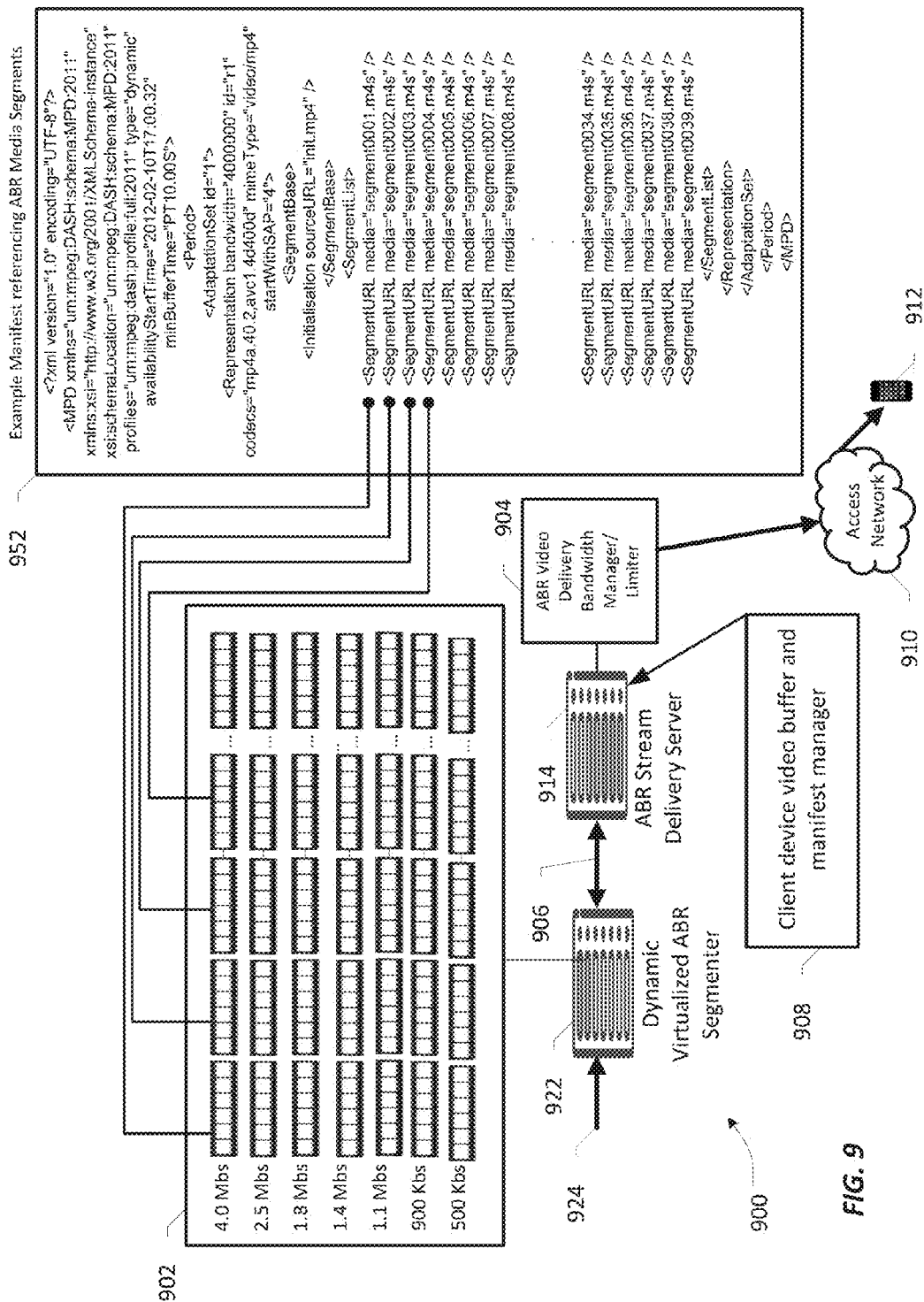
FIG. 9 depicts a block diagram of an example network subsystem for effectuating a virtualized representation of ABR media segments for purposes of the present patent disclosure.

FIG. 9 depicts a block diagram of an example network system or subsystem 600 operative at an edge network for effectuating virtualized representation of ABR media segments for purposes of facilitating manifest modification and delivery bitrate selection according to an embodiment of the present patent disclosure. A dynamic virtualized ABR segmenter 922 is operative to receive one or more media content streams 924 (segmented or unsegmented, live or on-demand) that may be encoded at different bitrates in order provide a virtualized representation of content segments in a random access memory (RAM) associated therewith. Reference numeral 902 refers to an illustrative RAM portion having a plurality data structures encompassing pointers that correspond to various time codes (e.g., PTS/DTS and SAP information) as well as references to content streams at bitrates ranging from 500. Kbs to 4.0 Mbs. A processing unit of the segmenter 922 is operative to generate a suitable manifest that includes a plurality of references corresponding to a plurality of content stream fragments, which may be provided to an ABR stream delivery server 914 for purposes of effectuating a streaming session with a client device 912. Reference numeral 952 is an example manifest referencing various ABR segments including 4.0 Mbs to 500 Kbs segments. The processing unit is further configured to obtain content bytes associated with a requested fragment from the data structures based on a start time and stop time associated with the requested fragment and computing corresponding pointers associated with the plurality of data structures to look up the content byte data. Additional details regarding virtualized segmentation of ABR content streams may be found in commonly owned U.S. Pat. No. 8,762,452, incorporated by reference herein. Because the time code and SAP information of content streams is readily available, segments of different size and/or select bitrates may be constructed, whereby appropriate manifests therefor may be provided when bitrate throttling may be deemed appropriate. Accordingly, the ABR stream delivery server 914 interfaces via communication path 906 with the virtualized ABR segmenter 922 for obtaining/constructing suitable manifest files as well as sending requests for manifest files with specific bitrates depending on a client device's video buffer characteristics. As noted previously, a client device buffer and manifest manager 908 may be provided in association with the ABR delivery server 914 to execute one or more processes set forth hereinabove for effectuating buffer learning, monitoring and delivery bitrate modification. A modified manifest file with a select single bitrate may be provided to the client device 912, e.g., via an access network 910. An optional delivery bandwidth manager/limiter 904, integrated or otherwise associated with the ABR stream delivery server 914, may also be provided for managing a bandwidth pipe provided to the client device 912 via the access network 910.

Figure 10:
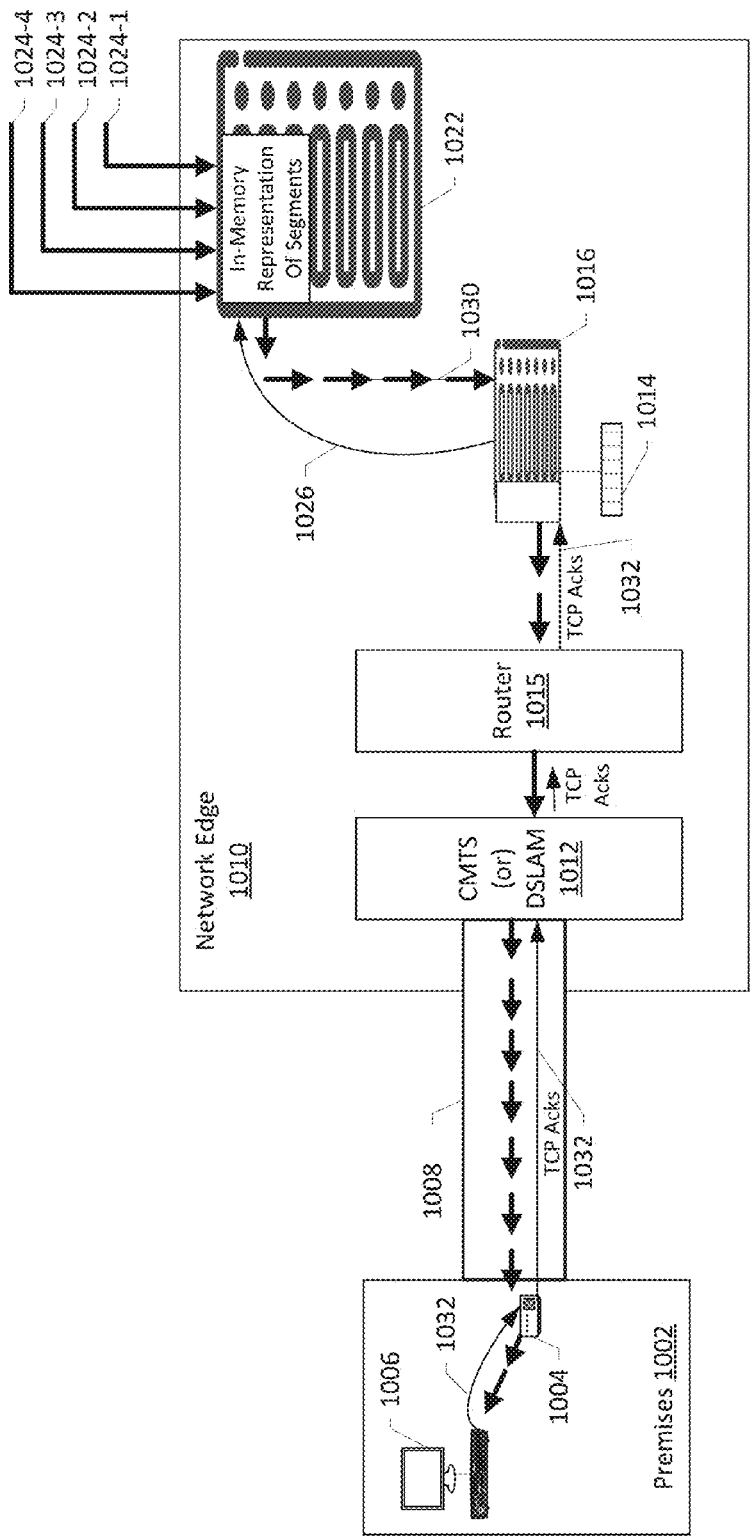
FIG. 10 depicts an example DOCSIS or DSL network arrangement serving a subscriber premises wherein an embodiment of the present invention may be practiced at a network node for managing bitrate delivery to a subscriber/client device disposed in the premises.

FIG. 10 depicts an example DOCSIS or DSL network arrangement 1000 serving a subscriber premises 1002 wherein an embodiment of the present invention may be practiced at a network node or a subsystem 1010 associated therewith for managing bitrate delivery to a subscriber/client device 1006 disposed in the premises 1002. An incoming broadband pipe 1008 is operatively disposed between the network subsystem 1010 and premises 1002 for facilitating distribution of various types of streaming content from a plurality of content sources or providers to one or more client devices disposed therein. In the example embodiment shown in FIG. 10, a dynamic virtualized ABR segmenter 1022 is provided as part of the network node/subsystem 1010, which accordingly receives live segmented streams 1024-1, live unsegmented streams 1024-2, VOD segmented streams 1024-3 and VOD unsegmented streams 1024-4 thereat. In an alternative arrangement where the network node subsystem 1010 does not include virtualized segmentation of incoming content, appropriate content streams may be directly provided to an ABR stream delivery server 1016. A bandwidth controlled/monitored delivery manager (e.g., involving WFQ-based bandwidth management techniques) may be optionally associated or otherwise integrated with the ABR stream delivery server 1016 for managing the delivery pipe 1008 having certain bandwidth (e.g., a 15 Mbs virtual pipe) that serves the premises 1002 via suitable intermediary elements 1012 such as CMTS (for cable infrastructure), DSLAM (for DSL infrastructure), router 1014, etc.

As one skilled in the art will recognize, subscriber premises 1002 may be a home, building, campus, organization, etc., served by a suitable premises node 1004 (e.g., a DSL gateway (GW) for DSL or a cable modem for DOCSIS/CMTS), which may be coupled to a plurality of subscriber devices, e.g., customer premises equipment or CPE, via a premises network (not specifically shown) that may comprise a wireless and/or wireline communications network operating with suitable protocols (e.g., Ethernet and/or WiFi). It should be appreciated that example CPE may comprise ABR client devices as well as non-ABR client devices, e.g., OTT/STB players, smart Blu-Ray players, tablet players, laptops, etc., each with varying priority weights for respective media sessions and/or progressive download sessions. For the sake of simplicity, however, only one example CPE 1006 is illustratively shown in the example arrangement 1000 of FIG. 10, whose video buffer may be modeled and simulated in a client device buffer representation that may be provided as a database storage element 1014 associated with the ABR stream delivery server 1016. Clearly, the database storage element 1014 may be configured to store video buffer representations of a plurality of client devices' media players that are engaged in respective sessions via the network edge 1010.

As the client device 1006 initiates a media session and starts receiving segments via the bandwidth pipe 1008, delivery acknowledgements 1032 are provided to the ABR stream delivery server 1016 which uses receipt of such acknowledgements in buffer modeling and simulation as set forth in detail hereinabove. Responsive to the client device's buffer characteristics and current network conditions (which may be determined using techniques that a traditional client might employ, for example), the ABR stream delivery server 1016 makes suitable determinations as to what sorts of bitrate encodings the client device 1006 needs and at what speed. A segment bitrate request 1026 may be provided to the dynamic virtualized ABR segmenter 1022 (where implemented as part of the network edge subsystem 1010). Media segments 1030 of appropriate bitrate encoding may be accordingly provided to the ABR stream delivery server 1016 for delivery to the client device 1006.

Figure 11:
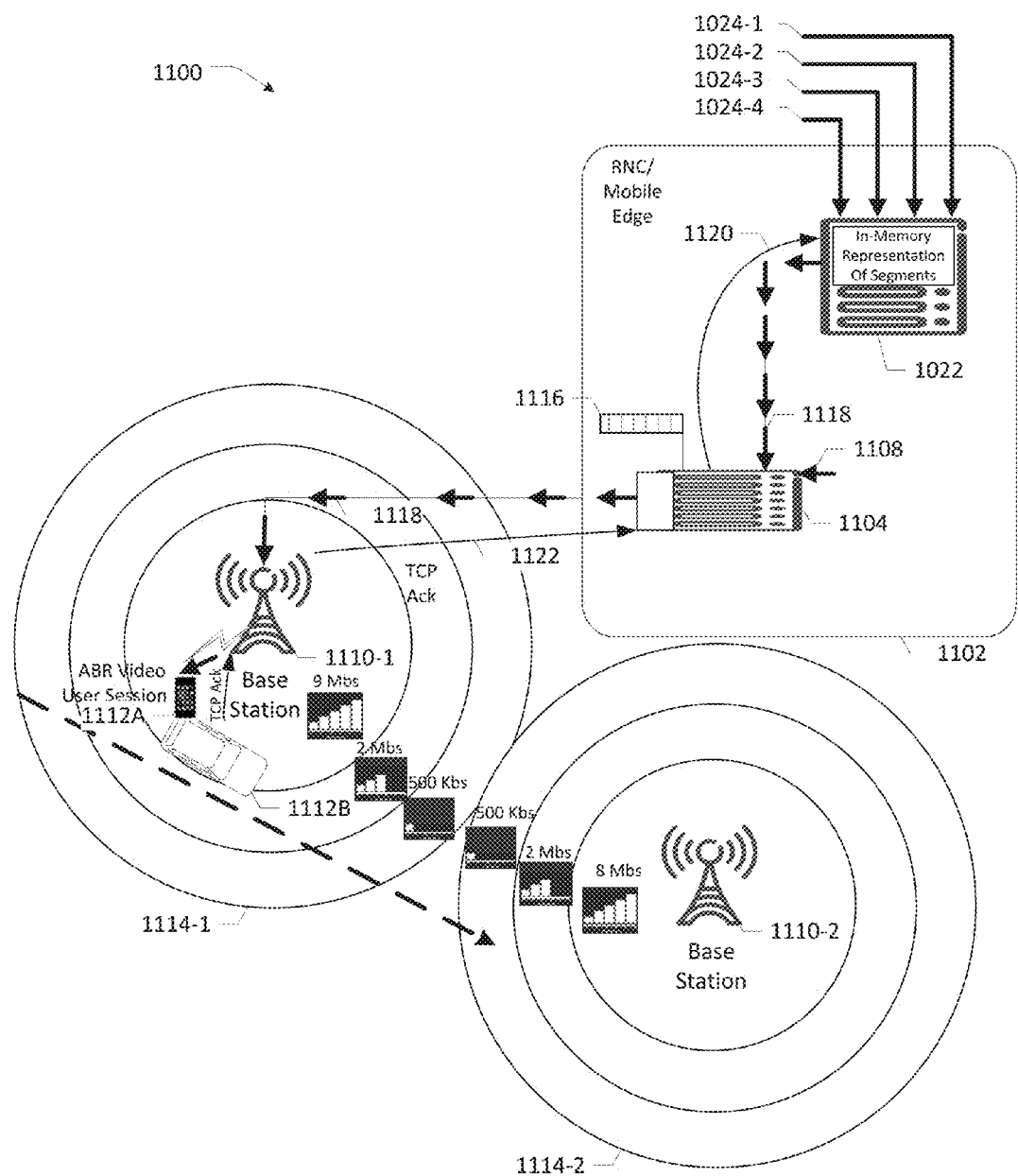
FIG. 11 depicts an example wireless network environment serving a mobile subscriber wherein an embodiment of the present invention may be practiced at a network node for managing bitrate delivery to a subscriber/client device of the mobile subscriber.

FIG. 11 depicts an example wireless network environment 1100 serving a mobile subscriber wherein an embodiment of the present invention may be practiced at a network node or associated subsystem for managing bitrate delivery to a subscriber/client device of the mobile subscriber (represented as a wireless telecommunications device 1112A in a moving vehicle 1112B). Although a plurality of wireless or mobile devices may be operational in the wireless environment 1100 comprising an exemplary mobile communication network or carrier network, only one mobile device 1112A is shown in FIG. 11 for simplicity. In the discussion herein, the terms "wireless network" "mobile communication network," "carrier network," or terms of similar import may be used interchangeably to refer to a wireless communication network (e.g., a cellular network, a proprietary data communication network, a corporate-wide wireless network, etc.) that facilitates voice and/or data communications with different types of wireless mobile devices. In one embodiment, some of the devices may be a wireless User Equipment (UE) or a Mobile Station (MS) (also known by various analogous terms such as "mobile handset," "wireless handset," "mobile device," "mobile terminal," etc.) capable of receiving adaptively streamed/delivered audio-visual content via the wireless network infrastructure and playing it using a local ABR client player executing thereon. In some other embodiments, wireless mobile devices may comprise portable gaming devices, electronic tablets, laptops equipped with suitable wireless modems, e-readers, and the like, as alluded to previously.

It should be appreciated that a particular challenge in a wireless environment such as the wireless network 1100 is the variable network signal strength of the base stations or radio towers that serve the mobile devices. Depicted herein are various interactions between a mobile edge node or radio network controller (RNC) 1102 that includes an ABR stream delivery server 1104 and base stations 1110-1, 1110-2 having respective coverage areas 1114-1, 1114-2. As is known in the art, a radio coverage area by a base station may take any shape and include varying levels of signal quality and strength. Illustratively, the coverage areas 1114-1 and 1114-2 of base stations 1110-1, 1110-2 are exemplified as circular regions comprising concentric contours that signify varying signal levels, each depicted with a respective signal level indicator icon (e.g., having one or more signal bars).

In one embodiment, mobile edge node 1102 may comprise an RNC that may include a dynamic virtualized ABR segmenter operative to receive various content streams, e.g., similar to segmenter 1022 shown in FIG. 10 above. As before, the ABR stream delivery server 1104 provided as part of the mobile edge subsystem 1102 may include a bandwidth controlled/monitored delivery manager that manages a real-time device mobile session interface 1108 via the base stations 1110-1, 1110-2 for facilitating a streaming session with the mobile device 1112A as it travels from coverage area 1114-1 to coverage area 1114-2. Further, a database storage element 1116 is associated with the ABR stream delivery server 1104 for in-memory representation of modeled video buffers of one or more mobile devices engaged in respective streaming sessions in the wireless network 1100, including the mobile device 1112A being served by one or more base stations 1110-1, 1110-2, e.g., in a location-based or location-aware database implementation.

As the mobile device 1112A engages in a media session and starts receiving segments via base station 1110-1, appropriate delivery acknowledgements 1122 are provided to the ABR stream delivery server 1104, which uses receipt of such acknowledgements in buffer modeling and simulation as set forth hereinabove. Responsive to the client device's buffer characteristics and current network conditions (including the indications of variable radio signal levels as the mobile device 1112A traverses through coverage areas 1114-1, 1114-2), the ABR stream delivery server 1104 makes suitable determinations regarding appropriate bitrate encodings suitable for the mobile client device 1112A. A segment bitrate request 1120 may be provided to the dynamic virtualized ABR segmenter 1022 (where implemented as part of the mobile edge subsystem 1102). Media segments 1118 of appropriate bitrate encoding may be accordingly provided to the ABR stream delivery server 1104 for delivery to the mobile client device 1112A via serving base station 1110-1 or 1110-2.

Figure 12:
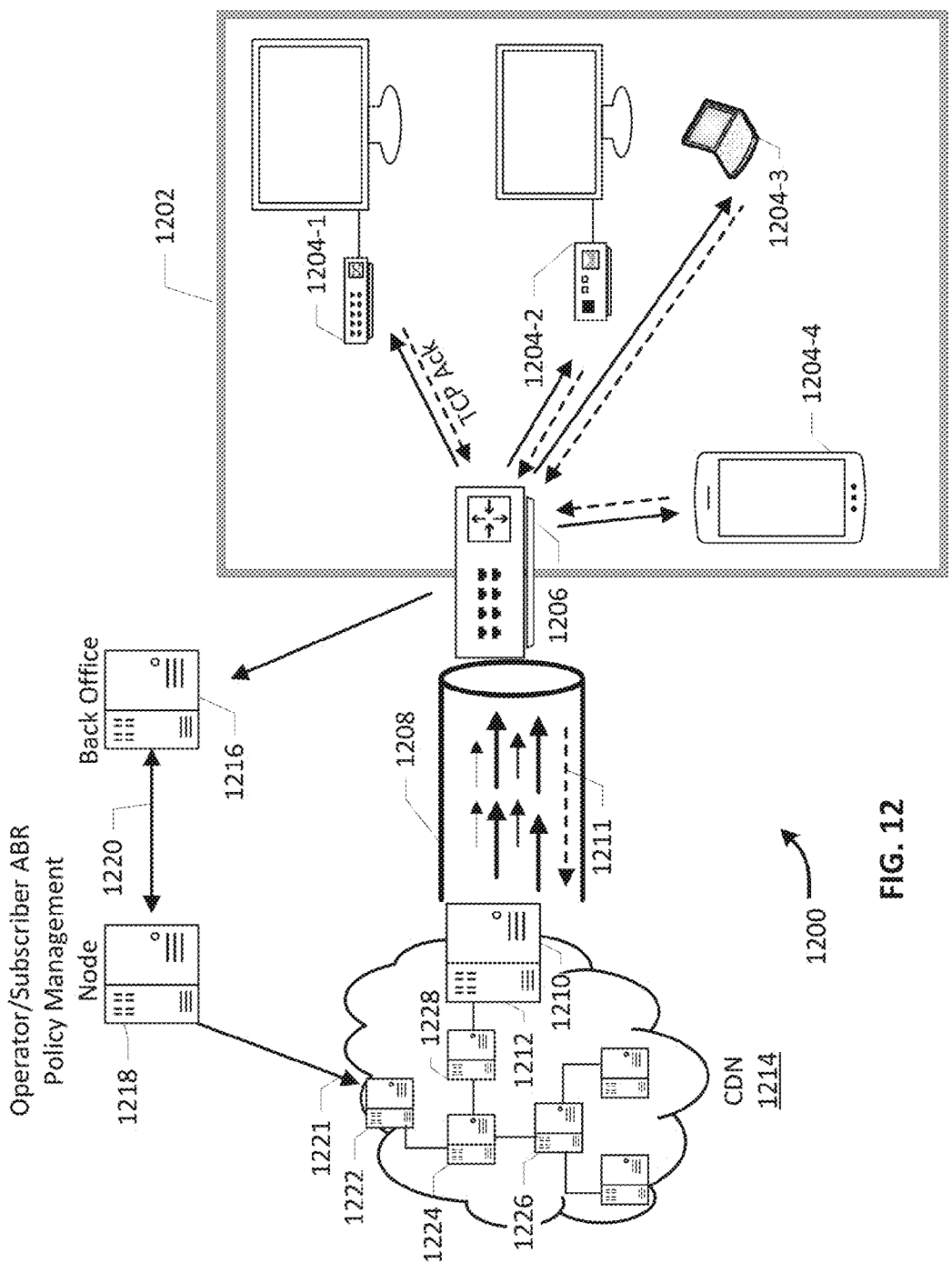
FIG. 12 depicts an example CDN arrangement serving a subscriber premises wherein an embodiment of the present invention may be practiced at a delivery edge network node for managing bitrate delivery to a subscriber/client device disposed in the premises.

In a still further implementation, FIG. 12 depicts an example CDN environment 1200 serving a subscriber premises 1202 wherein an embodiment of the present invention may be practiced at or in conjunction with a delivery edge network node 1210 of a CDN 1214. For purposes of the present patent application, CDN 1214 may comprise an overlay network architected for high-performance streaming of a variety of live/NOD digital assets or program assets as well as services to subscribers using one or more Internet-based infrastructures, private/dedicated infrastructures or a combination thereof. In general, the overlay architecture of CDN 1214 may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. In addition to such "distribution servers" (sometimes also referred to as "surrogates"), CDN 1214 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of the associated back office infrastructure. In FIG. 12, an example subscriber/operator management system 1218 is deployed in conjunction with a back office node 1216, with a suitable communication interface 1220 provided therebetween. Additional back office infrastructure may include operator pipe and content policy node(s), subscriber device profile and priority definition node(s), in addition to streaming policy server node (s), billing node(s) and a subscriber authentication node(s), which are not explicitly shown in FIG. 12 for clarity reasons.

In the example CDN arrangement 1200 of FIG. 12, subscriber premises 1202 may be configured substantially similar to the premises 1002 described hereinabove and will not be described in further detail here, except that a home gateway 1206 is operative to communicate with back office 1216 in some embodiments. Further, subscribes premises 1202 is explicitly shown as having a plurality of client devices 1204-1 to 1204-4, including a wireless phone 1204-4 having ABR streaming capability for downloading ABR content at a certain priority weight value. CDN 1214 is exemplified with a redirector node 1222 and a central origin server node 1224 that is operative to distribute content to a plurality of regional nodes, e.g., nodes 1226, 1228, and ultimately to various edge/delivery nodes serving subscribers at different geographic locations, based on subscriber policies. An example subscriber policy with respect to the subscriber premises 1202 may comprise:

Subscriber 1 Policy
Physical To-Home Pipe: 10 Mbs
Sony 46"/Sony Blu-Ray: Wt 3.0-4.426 Mbs—Session ID 1
LG 32" TV/Bluray-Player: Wt 1.75-2.58 Mbs—Session ID 2
Tablet: Wt 0.75-1.196 Mbs—Session ID 3
SD TV/OTT STB Priority 3 Wt 0.75-1.196 Mbs—Session ID 4
Phone: Wt 0.352-0.519 Mbs—Session ID 5
Non-ABR Data: Wt 0.175-0.258 Mbs—Session ID 6 that may be provided by the operator/subscriber policy management node 1218 to the redirector node 1222 via a suitable communication path 1221. By way of illustration, edge delivery node 1210 serving subscriber premises 1202 is hierarchically coupled to regional node 1228. In accordance with the teachings of the present disclosure, a client device buffer manager 1212 is operative in association with the edge delivery node 1210 for modeling buffer characteristics of the client devices 1204-1 to 1204-4, which may be engaged in respective streaming sessions via a dynamic virtual pipe 1208 provided to the premises gateway 1206. As described before, various delivery acknowledgement messages (e.g., TCP Ack messages 1211) from respective client devices may be processed by the edge node and associated client device buffer manager functionality for purposes of modeling and simulating the respective video buffer characteristics. Responsive to the modeled buffer characteristics and current network conditions, the CDN edge node makes suitable determinations regarding optimal bitrate encodings for respective client devices of the subscriber premises 1202 in order to facilitate a more consistent streaming experience.

Figure 13:
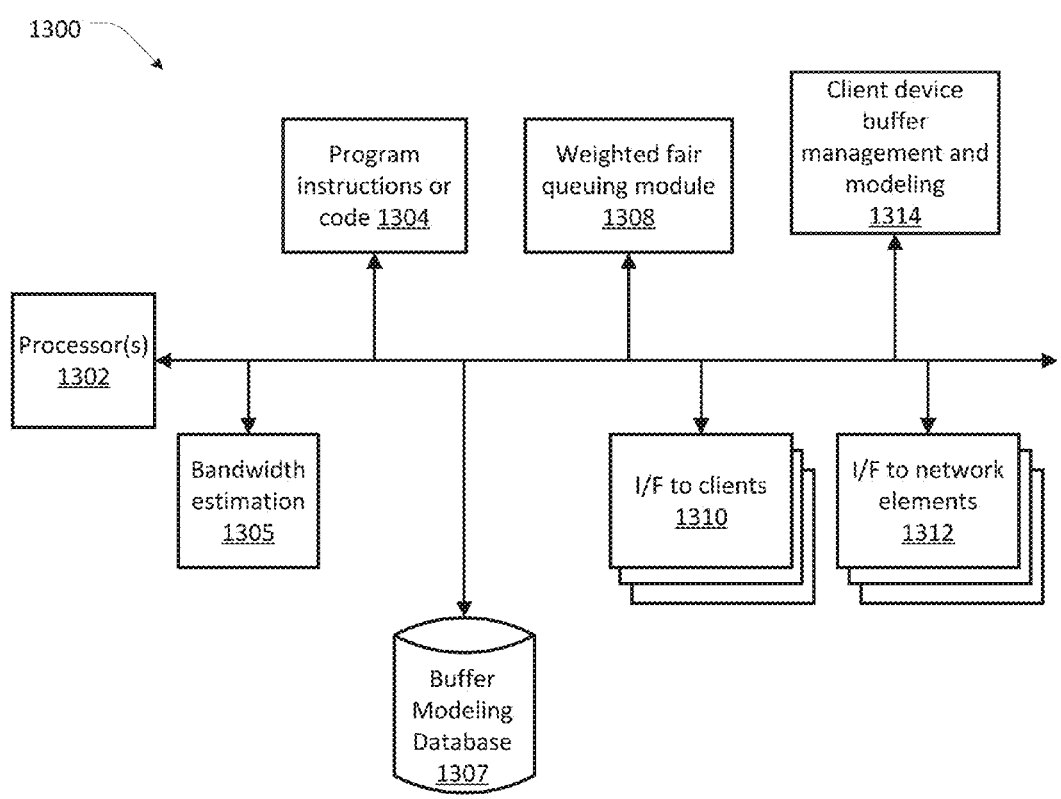
FIG. 13 depicts a block diagram of an apparatus that may be configured as an ABR delivery server and/or associated dynamic virtual segmenter at an edge network portion for practicing an embodiment of the present invention.

FIG. 13 depicts a block diagram of an example apparatus operative as an ABR stream delivery server, an edge network subsystem or a suitable upstream network node for implementing one or more embodiments described hereinabove. One or more processors 1302 may be operatively coupled to various modules that may be implemented in persistent memory for executing suitable program instructions or code portions with respect to one or more processes set forth hereinabove for effectuating client device buffer modeling and simulation as well as manifest modification, as exemplified by module 1314. A buffer modeling database 1307 may be provided for storing in-memory representations of a plurality of client devices' video buffers, which may be structured as database records corresponding to individual client devices and their respective streaming sessions. Optionally, additional modules such as WFQ module 1308, bandwidth estimation module 1305, and the like may also be provided to enhance or exert more control over bandwidth allocated to various clients or groups of clients under suitable program instructions or code 1304 executable by the processors 1302. Where a network edge subsystem includes dynamic virtualized segmentation, such functionality may be also embodied in suitable program instructions or code 1304. Appropriate client interfaces (I/F) 1310 may be provided for facilitating wireline or wireless connectivity to a plurality of client devices. Likewise, appropriate interfaces 1312 to various network elements and/or premises nodes may be provided depending on a particular network node implementation. For example, in a CDN implementation, such interfaces may include interfaces to one or more regional distribution nodes, or other peer edge delivery nodes, or policy management nodes, or HTTP content servers, etc., as well as interfaces configured to effectuate a delivery pipe to a subscriber premises node. In a mobile communications network implementation, the interfaces may include interfaces to downstream backhaul network elements, e.g., to base stations, or upstream backhaul network elements, e.g., HTTP content servers, as well as other network elements of a mobile network infrastructure. Accordingly, depending on the context, interfaces selected from interfaces 1310 or interfaces 1312 may sometimes be referred to as a first interface, a second interface, and the like.

Figure 14:
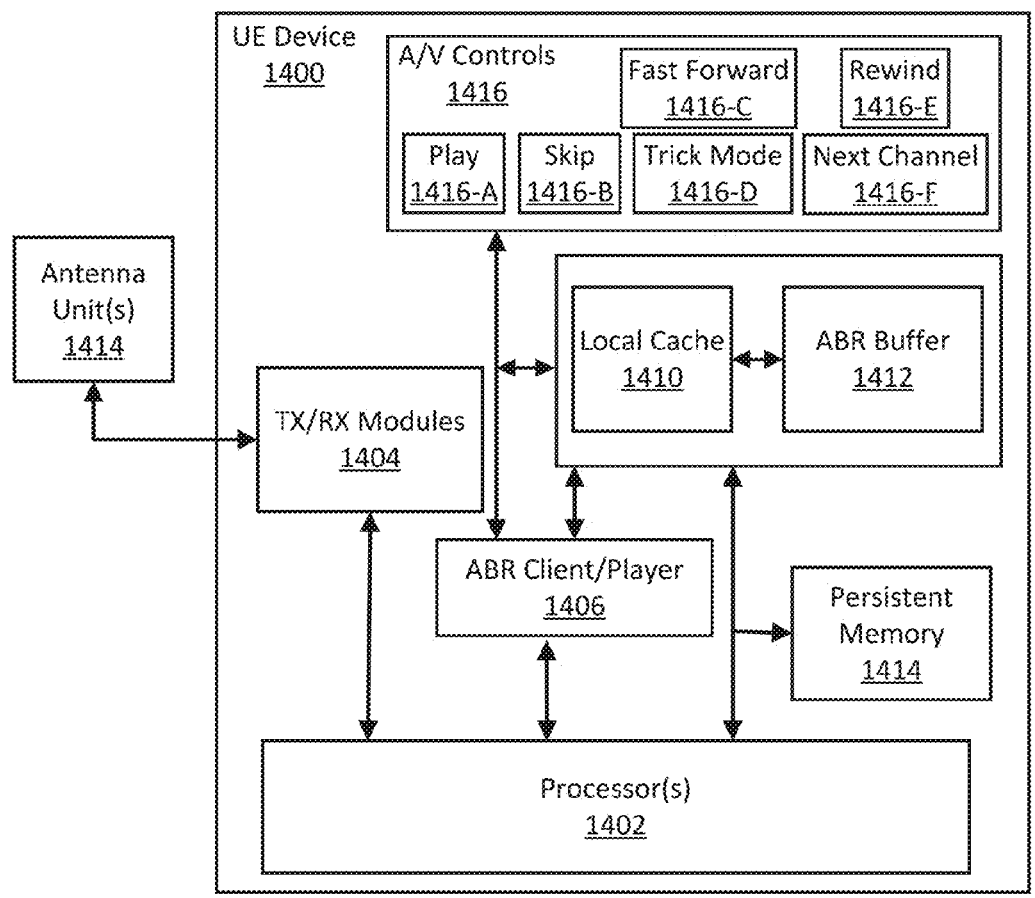
FIG. 14 depicts a block diagram of an example client device configured to receive segmented media content according to an embodiment of the present invention.

FIG. 14 depicts a block diagram of an example client device 1400 including an ABR video client/player 1406 configured to execute media playback under control of processor(s) 1402, wherein the media content may be delivered to the client device 1400 according to one or more embodiments of the present patent application. Appropriate transceiver (Tx/Rx) circuitry 1404 may be coupled to one or more antenna units 1414 where radio communications connectivity (e.g., long-range and/or short-range) is provided as part of the client device 1400. The ABR client 1406 is operative to play out segments stored in an ABR video buffer 1412, which may be configured to store segments of a select bitrate for playback as described above. A local cache 1410 may also be provided to store preloaded content in certain embodiments.

In one example implementation, the ABR client/player 1406 may be provided with a plurality of ABR client controls 1416 that may be selectively operated by users for controlling user experience. Such ABR client controls may comprise audio controls as well as video controls available with respect to a streaming session and may include Play 1416-A, Skip 1416-B, Fast Forward 1416-C, Trick Mode or Trick Play 1416-D, Rewind 1416-E, and Next Channel or Channel Change 1416-E. As noted hereinabove, video buffer usage and characteristics may be affected when certain client controls are executed during a streaming session, and any such changes in the video buffer may be modeled or simulated in the network to optimize delivery bitrates. A persistent memory module 1414 may be provided for storing appropriate program code or software instructions that may be executed by processors 1402 for effectuating various ABR client functionalities, inter alia, in conjunction with other modules of the client device 1400.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method implemented by an adaptive bitrate (ABR) server for managing delivery of segmented media content in an ABR network, the method comprising:
    obtaining video buffer characteristics of a media player associated with a client device configured to receive segmented media content from an ABR delivery server in a streaming session;
    modifying manifest files of a first set of the segmented media content to include metadata information of media segments encoded at a single bitrate and removing metadata information pertaining to media segments of the segmented media content encoded at other bitrates, wherein the single bitrate is selected based at least in part upon the video buffer characteristics of the client device's media player; and
    providing the modified manifest files of the first set of the segmented media content to the client device responsive to the obtained video buffer characteristics of the media player;
    monitoring a duration of time taken for transmitting all bytes of a segment from the first set of the segmented media content to the client device;
    obtaining a delivery bitrate of the segment from the first set of the segmented media content based on the duration of time;
    comparing the delivery bitrate with one or more bitrates of the other bitrates of the removed metadata information identified in the pre-modified manifest files;
    determining that a bitrate of a second set of the segmented media content is to be adjusted based upon the comparison step; and
    modifying manifest files of the second set of the segmented media content to include a bitrate responsive to the determining step;
    wherein the modifying of the manifest files of the second set of the segmented media content further comprises determining whether the delivery bitrate is less than the single bitrate in the modified manifest files of the first set of the segmented media content plus an overhead threshold;
        based on determining the delivery bitrate is not less than the single bitrate in the modified manifest files of the first set of the segmented media content plus the overhead threshold, determining whether the client device's media player is playing the first set of the segmented media content at a highest bitrate identified in the pre-modified manifest files; and
            based on the determination that the client device's media player is not playing the first set of the segmented media content at the highest bitrate identified in the pre-modified manifest files, performing a bitrate move up process for selecting a higher bitrate than is currently being used from a list of the other bitrates of the removed metadata information identified in the pre-modified manifest files, wherein the selected higher bitrate is used in the modified manifest files of the second set of the segmented media content;
            based on the determination that the client device's media player is playing the segmented media content at the highest bitrate identified in the pre-modified manifest files, bypassing a bitrate adjustment and waiting for a segment pull and associated request for another segment of the segmented media content from the client device before modifying the manifest files of the second set of the segmented media content;
        based on determining the delivery bitrate is less than the single bitrate in the modified manifest files of the first set of the segmented media content plus the overhead threshold, determining whether the client device's media player is playing the first set of the segmented media content at a lowest bitrate identified in the pre-modified manifest files; and
            based on the determination that the client device's media player is not playing the first set of the segmented media content at a lowest bitrate identified in the pre-modified manifest files, performing a bitrate move down process for selecting a lower bitrate than is currently being used from the list of the other bitrates of the removed metadata information identified in the pre-modified manifest files, wherein the selected lower bitrate is used in the modified manifest files of the second set of the segmented media content;

based on the determination that the client device's media player is playing the first set of the segmented media content at the lowest bitrate identified in the pre-modified manifest files, bypassing a bitrate adjustment and waiting for a segment pull and associated request for another segment of the segmented media content from the client device before modifying the manifest files of the second set of the segmented media content.

2. The method as recited in claim 1, wherein the video buffer characteristics are obtained based on learning by the ABR delivery server of the media player's playout behavior and comprise at least one of an estimated number of segments operative to be stored in the video buffer of the media player, an estimate of segment duration, a total number of bytes of data that the video buffer is estimated to contain when full and a simulated video buffer playout performance based on a duty cycle pattern associated with downloading of segmented media content by the client device.

3. The method as recited in claim 2, wherein the estimated number of segments and the total number of bytes are calculated upon reaching a maximum delivery bitrate during a ramp up phase of the streaming session.

4. The method as recited in claim 2, wherein the estimate of segment duration is determined upon learning the duty cycle pattern associated with downloading of segmented media content.

5. The method as recited in claim 1, wherein media content requested by the client device is virtually segmented by a dynamic virtual segmenter and further wherein the ABR delivery server is operative to intercept manifest files, generated for the virtually segmented media content, prior to modifying the manifest files based on the video buffer characteristics of the client device's media player.

6. The method as recited in claim 1, wherein the ABR delivery server is configured as at least a part of an edge network node associated with one of a Digital Subscriber Line (DSL) network architecture, a Data Over Cable Service Interface Specification (DOCSIS)-compliant Cable Modem Termination System (CMTS) network architecture, a mobile telecommunications network architecture, and a content delivery network (CDN) architecture.

7. The method as recited in claim 1, wherein the step of modifying the manifest files of the subsequent segments further includes taking into account network bandwidth conditions monitored relative to other client devices disposed in the ABR network.

8. The method as recited in claim 1, wherein the obtaining step further comprises querying a database to determine what type of buffer is used by the client device.

9. An apparatus configured to operate as an adaptive bitrate (ABR) delivery server for managing delivery of segmented media content in an ABR network, the apparatus comprising:

at least one processor; and a persistent memory module coupled to the at least one processor, wherein the persistent memory module includes program instructions which, when executed by the at least one processor, enable the apparatus to operate as follows:

learn video buffer characteristics of a client device's media player in a streaming session pursuant to a media request therefor;

store the learned video buffer characteristics in the client buffer database;

modify manifest files of a first set of the segmented media content requested by the client device to include metadata information of media segments encoded at a single bitrate and removing metadata information pertaining to media segments of the segmented media content encoded at other bitrates, wherein the single bitrate is selected based at least in part upon the video buffer characteristics of the client device's media player;

provide the modified manifest files of the first set of the segmented media content to the client device responsive to the obtained video buffer characteristics of the media player;

monitor a duration of time taken for transmitting all bytes of a segment from the first set of the segmented media content to the client device;

obtain a delivery bitrate of the segment from the first set of the segmented media content based on the duration of time;

compare the delivery bitrate with one or more bitrates of the other bitrates of the removed metadata information identified in the pre-modified manifest files;

determine that a bitrate of a second set of the segmented media content is to be adjusted based upon the comparison operation; and modify manifest files of the second set of the segmented media content to include a bitrate responsive to the determine operation;

wherein the modification of the manifest files of the second set of the segmented media content further comprises determine whether the delivery bitrate is less than the single bitrate in the modified manifest files of the first set of the segmented media content plus an overhead threshold;

based on the determination that the delivery bitrate is not less than the the single bitrate in the modified manifest files of the first set of the segmented media content plus the overhead threshold, determine whether the client device's media player is playing the first set of the segmented media content at a highest bitrate identified in the pre-modified manifest files; and based on the determination that the client device's media player is not playing the first set of the segmented media content at the highest bitrate identified in the pre-modified manifest files, perform a bitrate move up process for selecting a higher bitrate than is currently being used from a list of the other bitrates of the removed metadata information identified in the pre-modified manifest files, wherein the selected higher bitrate is used in the modified manifest files of the second set of the segmented media content;

based on the determination that the client device's media player is playing the segmented media content at the highest bitrate identified in the pre-modified manifest files, bypass a bitrate adjustment and wait for a segment pull and associated request for another segment of the segmented media content from the client device before modifying the manifest files of the second set of the segmented media content;

based on the determination that the delivery bitrate is less than the single bitrate in the modified manifest files of the first set of the segmented media content plus the overhead threshold, determine whether the client device's media player is playing the first set of the segmented media content at a lowest bitrate identified in the pre-modified manifest files; and based on the determination that the client device's media player is not playing the first set of the segmented media content at a lowest bitrate identified in the pre-modified manifest files, perform a bitrate move down process for selecting a lower bitrate than is currently being used from the list of the other bitrates of the removed metadata information identified in the modified manifest files, wherein the selected lower bitrate is used in the modified manifest files of the second set of the segmented media content;

based on the determination that the client device's media player is playing the first set of the segmented media content at the lowest bitrate identified in the pre-modified manifest files, bypass a bitrate adjustment and wait for a segment pull and associated request for another segment of the segmented media content from the client device before modifying the manifest files of the second set of the segmented media content.

10. The apparatus as recited in claim 9, wherein the client buffer database is configured to store the video buffer characteristics comprising at least one of an estimated number of segments that can be stored in the video buffer of the media player, an estimate of segment duration, a total number of bytes of data that the video buffer is estimated to contain when full and a simulated video buffer playout performance based on a duty cycle pattern associated with downloading of segmented media content by the client device.

11. The apparatus as recited in claim 10, wherein the program instructions further comprise instructions for calculating the number of segments and the total number of bytes upon reaching a maximum delivery bitrate during a ramp up phase of the streaming session.

12. The apparatus as recited in claim 10, wherein the program instructions further comprise instructions for determining the segment duration estimate upon learning the duty cycle pattern associated with downloading of segmented media content.

13. The apparatus as recited in claim 9, further comprising a dynamic virtual segmenter coupled to the ABR delivery server and operative to virtually segment the media content into a plurality of data structures stored in a random access memory unit, wherein the plurality of data structures include pointers corresponding to time codes and references to one or more access points in the media content, and further wherein the program instructions include instructions executed by the ABR delivery server for intercepting manifest files, generated for the virtually segmented media content, prior to modifying the manifest files based on the video buffer characteristics of the client device's media player.

14. The apparatus as recited in claim 9, wherein the ABR delivery server is configured as at least a part of an edge network node associated with one of a Digital Subscriber Line (DSL) network architecture, a Data Over Cable Service Interface Specification (DOCSIS)-compliant Cable Modem Termination System (CMTS) network architecture, a mobile telecommunications network architecture, and a content delivery network (CDN) architecture.

15. The apparatus as recited in claim 9, wherein the operation to modify the manifest files of the subsequent segments further includes an operation to take into account network bandwidth conditions monitored relative to other client devices disposed in the ABR network.

16. The apparatus as recited in claim 9, wherein the learn operation further comprises query a database to determine what type of buffer is used by the client device.

\* \* \* \* \*